US012645504B2

(12) United States Patent　　(10) Patent No.:　US 12,645,504 B2

Molleti　　(45) Date of Patent:　　Jun. 2, 2026

(54) SERVERLESS PARALLEL DISTRIBUTION OF DEPLOYMENT SOFTWARE

(71) Applicant: RAKUTEN SYMPHONY, INC., Tokyo (JP)

(72) Inventor: Kranthi Molleti, Indore (IN)

(73) Assignee: RAKUTEN SYMPHONY, INC., Tokyo (JP)

( * ) Notice: Subject to any disclaimer, the term of this patent is extended or adjusted under 35 U.S.C. 154(b) by 551 days.

(21) Appl. No.: 18/020,071

(22) PCT Filed: Nov. 25, 2022

(86) PCT No.: PCT/US2022/051012
§ 371 (c)(1),
(2) Date: Feb. 6, 2023

(87) PCT Pub. No.: WO2024/112344
PCT Pub. Date: May 30, 2024

(65) Prior Publication Data
US 2024/0264880 A1　　Aug. 8, 2024

(51) Int. Cl.
*G06F 9/50*　　(2006.01)
*G06F 8/60*　　(2018.01)
(52) U.S. Cl.
CPC .............. *G06F 9/5083* (2013.01); *G06F 8/60* (2013.01); *G06F 9/505* (2013.01); *G06F 9/5072* (2013.01)
(58) Field of Classification Search
CPC .......... G06F 9/5083; G06F 8/60; G06F 9/505; G06F 9/5072; G06F 2209/505; G06F 9/541
See application file for complete search history.

(56) References Cited

U.S. PATENT DOCUMENTS

| | | | | |
|---|---|---|---|---|
| 10,560,398 B2 * | 2/2020 | Kimmet | .................... | G06F 8/61 |
| 11,537,400 B1 * | 12/2022 | Zhang | ........................ | G06F 8/53 |
| 12,058,206 B1 * | 8/2024 | Wei | ......................... | H04L 67/61 |
| 2012/0310423 A1 * | 12/2012 | Taft | ........................ | G06Q 50/06 |
| | | | | 700/286 |
| 2013/0054813 A1 * | 2/2013 | Bercovici | .......... | G06F 9/45533 |
| | | | | 718/1 |
| 2013/0276070 A1 * | 10/2013 | Lee | ........................ | G06F 21/45 |
| | | | | 726/4 |
| 2015/0074278 A1 * | 3/2015 | Maes | .................... | G06F 9/5072 |
| | | | | 709/226 |
| 2017/0085486 A1 * | 3/2017 | Chung | ................ | H04L 41/0895 |
| 2017/0257432 A1 * | 9/2017 | Fu | ........................ | H04L 67/1014 |

(Continued)

*Primary Examiner* — Benjamin C Wu
(74) *Attorney, Agent, or Firm* — HAUPTMAN HAM, LLP

(57) ABSTRACT

A system, includes processing circuitry; and a memory connected to the processing circuitry, wherein the memory is configured to store executable instructions that, in response to being executed by the processing circuitry, facilitate performance of operations to request deployment software for a telecommunications system from a central inventory; send the deployment software to a load balancer that distributes executable portions of the deployment software to two or more cloud adaptors (CAs) that are operably connected to the load balancer; generate worker threads based on the distributed executable portions of the deployment software; and distribute the worker threads to hybrid clusters for execution of the worker threads and implementation of the deployment software.

20 Claims, 5 Drawing Sheets

(56)     References Cited

U.S. PATENT DOCUMENTS

| | | | |
|---|---|---|---|
| 2017/0346683 A1* | 11/2017 | Li | H04L 41/5058 |
| 2020/0026579 A1* | 1/2020 | Bahramshahry | G06F 9/5077 |
| 2021/0084103 A1* | 3/2021 | Smith | G06F 16/285 |
| 2021/0144517 A1* | 5/2021 | Guim Bernat | G06F 9/5072 |
| 2021/0405988 A1* | 12/2021 | Tahiri | G06F 9/5072 |
| 2023/0078518 A1* | 3/2023 | Huard | G06F 9/45558 |
| | | | 709/224 |
| 2023/0195373 A1* | 6/2023 | Pabón | G06F 3/0604 |
| | | | 711/154 |
| 2023/0376344 A1* | 11/2023 | Jutzi | G06F 9/45558 |
| 2024/0031444 A1* | 1/2024 | Simon | G06F 9/45558 |
| 2024/0264874 A1* | 8/2024 | Doshi | H04L 67/10 |
| 2024/0264880 A1* | 8/2024 | Molleti | G06F 9/541 |

* cited by examiner

100A

Computer: 2 pCore
Memory: 8 GB RAM
Parallel Execution: 150

100B

Each CA:
Computer: 2 pCore
Memory: 6 GB RAM
Parallel Execution: 500

100C

300

302 — REQUEST DEPLOYMENT SOFTWARE FROM CENTRAL INVENTORY

304 — SEND DEPLOYMENT SOFTWARE TO GS LOAD BALANCER

306 — GS LOAD BALANCER SENDS DEPLOYMENT TO F5 LOAD BALANCERS

308 — F5 LOAD BALANCER SENDS DEPLOYMENT TO CLOUD ADAPTOR

310 — CLOUD ADAPTOR GENERATES WORKER THREADS FOR CLUSTERS

312 — WORKER THREADS ARE EXECUTED BY CLUSTERS

SERVERLESS PARALLEL DISTRIBUTION OF DEPLOYMENT SOFTWARE

RELATED APPLICATIONS

The present application is a National Phase of International Application No. PCT/US2022/051012, filed Nov. 25, 2022.

TECHNICAL FIELD

This description relates to a system for serverless parallel deployments and method of using the same.

BACKGROUND

Serverless computing is a cloud computing execution model in which the cloud provider allocates machine resources on demand, taking care of the servers on behalf of customers. Serverless is a misnomer in the sense that servers are still used by cloud service providers to execute code for developers. However, developers of serverless applications are not concerned with capacity planning, configuration, management, maintenance, fault tolerance, or scaling of containers, virtual machines (VMs), or physical servers. Serverless computing does not hold resources in volatile memory; computing is rather done in short bursts with the results persevered to storage. When an application is not in use, there are no computing resources allocated to the application. Serverless computing simplifies the process of deploying code into production.

Parallel computing is a type of computation in which many calculations or processes are carried out simultaneously. Large problems are often divided into smaller ones, which are then solved at the same time. Parallel computers are roughly classified according to the level at which the hardware supports parallelism, with multi-core and multi-processor computers having multiple processing elements within a single machine, while clusters, massively parallel processors (MPPs), and grids use multiple computers to work on the same task. Specialized parallel computer architectures are sometimes used alongside traditional processors, for accelerating specific tasks.

SUMMARY

In some embodiments, a system, includes processing circuitry; and a memory connected to the processing circuitry, wherein the memory is configured to store executable instructions that, in response to being executed by the processing circuitry, facilitate performance of operations to request deployment software for a telecommunications system from a central inventory; send the deployment software to a load balancer that distributes executable portions of the deployment software to two or more cloud adaptors (CAs) that are operably connected to the load balancer; generate worker threads based on the distributed executable portions of the deployment software; and distribute the worker threads to hybrid clusters for execution of the worker threads and implementation of the deployment software.

In some embodiments, a method executed by processing circuitry, includes requesting, by a service orchestrator, deployment software for a telecommunications system from a central inventory; sending, by the service orchestrator, the deployment software to a load balancer that distributes executable portions of the deployment software to two or more cloud adaptors (CAs) that are operably connected to the load balancer; generating, by the two or more CAs, worker threads based on the distributed executable portions of the deployment software; and distributing, by the two or more CAs, the worker threads to hybrid clusters for execution of the worker threads and implementation of the deployment software.

In some embodiments, a non-transitory tangible computer readable storage medium storing a computer program, wherein the computer program contains instructions that in response to being executed, cause processing circuitry to perform operations to request deployment software for a telecommunications system from a central inventory; send the deployment software to a load balancer that distributes executable portions of the deployment software to two or more cloud adaptors (CAs) that are operably connected to the load balancer; generate worker threads based on the distributed executable portions of the deployment software; and distribute the worker threads to hybrid clusters for execution of the worker threads and implementation of the deployment software.

BRIEF DESCRIPTION OF THE DRAWINGS

Aspects of the present disclosure are best understood from the following embodiments read with the accompanying figures. In accordance with the standard practice in the industry, various features are not drawn to scale. The dimensions of the various features are arbitrarily increased or reduced for clarity of discussion.

DETAILED DESCRIPTION

Figure 1A:
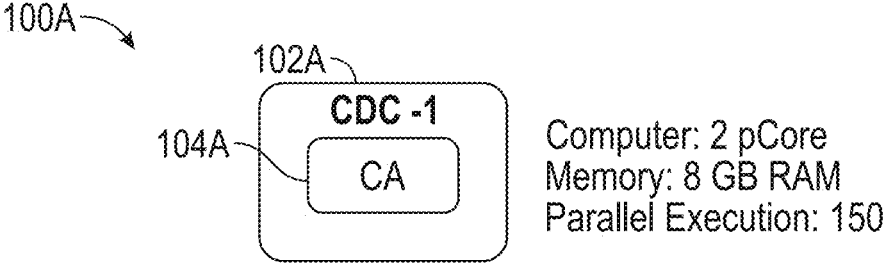
FIG. 1A is a block diagram of a cloud adaptor (CA) high availability (HA) design, in accordance with some embodiments.

The following embodiments include many different examples, for implementing different features of the subject matter. Examples of components, values, operations, materials, arrangements, or the like, are described below to simplify the embodiments. These are, of course, examples and unintended to limit. Other components, values, operations, materials, arrangements, or the like, are contemplated. For example, the formation of a first feature over or on a second feature in the description that follows include embodiments in which the first and second features are formed in direct contact, and further include embodiments in which additional features are formed between the first and second features, such that the first and second features are unable to contact directly. In addition, the present disclosure repeats reference numerals and/or letters in the various examples. This repetition is for the purpose of simplicity and clarity and any indication of a relationship between the various embodiments and/or configurations discussed is unintended.

Further, spatially relative terms, such as "beneath," "below," "lower," "above," "upper" and the like, are usable herein for ease of description to describe one element or feature's relationship to another element or feature as illustrated in the figures. The spatially relative terms are intended to encompass different orientations of the device in use or operation in addition to the orientation depicted in the FIGS. One or more apparatus embodiments are otherwise oriented (rotated 90 degrees or at other orientations) and the spatially relative descriptors usable herein likewise are interpreted accordingly.

In some embodiments, a method for serverless parallel deployments is discussed. In some embodiments, a method for serverless parallel deployments that provide a 10× improvement in execution time is discussed Other approaches have suggested a method for parallel computing on a serverless framework that has proven effective. However, deployments and upgrades of thousands of telecommunication sites across multiple locations in a state or nationwide takes anywhere from a few months to a year or more. A major operational expense for telecommunication operators is deployments, upgrades, and life cycle management (LCM). Telecommunication LCM is described as the approach an organization adopts to manage a telecommunication environment, and includes spending, usage, technology, processes, policy, and people.

In some embodiments, a parallel serverless method is configured to use one or more ingress controllers which handle multiple requests from operations support systems (OSS) and executes parallel deployments, upgrades, and LCM of telecommunication applications.

OSS are computer systems used by telecommunications service providers to manage their networks (e.g., telephone networks). OSS supports management functions such as network inventory, service provisioning, network configuration and fault management.

An ingress controller is a load balancer for open-source container orchestration systems for automating software deployment, scaling, and management. An ingress controller abstracts away the complexity of container orchestration systems application traffic routing and provides a bridge between container orchestration systems services and external services. Ingress controllers: (1) accept traffic from outside the container orchestration systems platform, and load balance the traffic to pods (containers) running inside the platform, (2) manage egress traffic within a cluster for services which need to communicate with other services outside of a cluster, (3) are configured using a container orchestration system application programming interface (API) to deploy objects called ingress resources, and (4) monitor the pods running in container orchestration systems and automatically update the load-balancing rules when pods are added or removed from a service.

In some embodiments, a parallel serverless system using ingress controllers reduces the time taken to deploy and upgrade from years or months to days. This reduction in deployment and upgrade time reduces operation expenses by more than 70%. In some embodiments, the use of a cloud adaptor (CA) in conjunction with the ingress controller provides for a high availability (HA) design (e.g., redundancy both local and geographical).

HA is a characteristic of a system which aims to ensure an agreed level of operational performance, usually uptime, for a higher-than-normal period. Modernization has resulted in an increased reliance on these systems. For example, hospitals and data centers require high availability of their systems to perform routine daily activities. Availability refers to the ability of the user community to obtain a service or good, access the system, whether to submit new work, update or alter existing work, or collect the results of previous work. In response to a user being unable to access the system, from the user's point of view the system is unavailable.

CAs simplify and accelerate integration between software as a service (SaaS or on demand software) applications and on-premise applications. In some embodiments, a parallel serverless system is configured with bare metal as a service (BMaaS)-CA functionality for platform deployment. BMaaS is bare metal server hardware with no software, just CPUs, memory, and storage. A dedicated CPU, full access to the hardware, and freedom to run custom operating systems.

In some embodiments, a parallel serverless system increases speed, decreases computing resources, and decreases cost. In some embodiments, parallel processes increase to 600 (direct) and up to 1000 (overloaded). In a non-limiting example, an integrated CA with a load balancer provides a redundancy (the duplication of critical components or functions of a system with the intention of increasing reliability of the system, usually in the form of a backup or fail-safe, or to improve actual system performance) of 99.999%. In another non-limiting example, an integrated CA with a load balancer controlling multiple load balancers provides a geographic redundancy of 99.999%.

In some embodiments, a CA performs greater than 100 parallel processes. In some embodiments, BMaaS performs pre-deployment activities via the CAs like creating tenants and namespaces, downloading bundles and helm charts, downloading images, and the like. A tenant is a customer who purchases cloud computing resources. This is an individual user, a group of users, or an entire department or company. A namespace is a way to group services for an application. When a namespace is created, a user determines how to discover service instances that are registered with Cloud Map (allows a user to register any application resources, such as databases, queues, microservices, and other cloud resources, with custom names): using API calls (a way for two or more computer programs to communicate with each other) or using domain name system (DNS) queries (hierarchical and distributed naming system used to identify computers reachable through the Internet or other Internet Protocol (IP) networks). A user is further able to determine the name for the application to use to discover instances. Helm Charts describe, install, and upgrade even the most complex open-source container orchestration systems applications.

In some embodiments, a computing system includes 3 GB of memory, 2 pCore (performance core) central processing units (CPUs), 4 vCPUs (2 virtual CPUs per pCore), and a hyper thread ratio of 1:4. In response to hyper-threading being enabled, the basic input output system (BIOS) is configured to use a logical to physical CPU ratio. This means that there are four (4) logical CPUs for each physical CPU. In some embodiments, a CA POD includes 1 GB of RAM with 2vCPUs.

In some embodiments, the time taken to perform an upgrade is reduced by 50%. In some embodiments, multiple platforms are supported. In some embodiments, multiple cloud providers are supported.

FIG. 1A is a block diagram of a cloud adaptor (CA) high availability (HA) design 100A, in accordance with some embodiments.

Cloud data center 1 (CDC-1) 102A includes a CA 104A. CA 104A performs similar to the CA devices discussed above. In a non-limiting example, CA 104A includes two pCore CPUs, such as processing circuitry 502 of FIG. 5, eight GB of random-access memory, such as memory 504 of FIG. 5, and handle 150 parallel executions.

Over time, organizations have increasingly moved away from on-premises data centers. Instead, CDCs have become more common. A CDC moves a traditional on-premises data center off-site. Instead of personally managing infrastructure, an organization leases infrastructure managed by a third-party partner and accesses data center resources over the Internet. Under this model, the cloud service provider is responsible for maintenance, updates, and meeting service level agreements (SLAs) for the parts of the infrastructure stack under their direct control. The migration from an on-premises data center to a CDC doesn't mean moving everything to the cloud. Many companies have hybrid CDCs which have a mix of on-premises data center components and virtual data centers components.

Figure 1B:
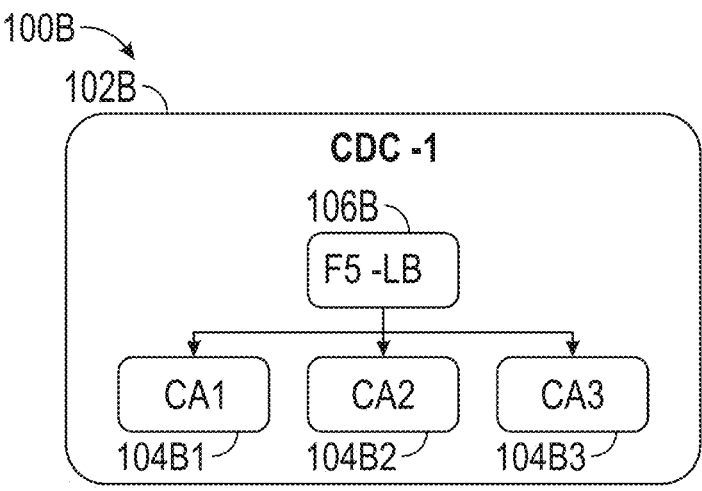
FIG. 1B is a block diagram of a cloud adaptor (CA) high availability (HA) design, in accordance with some embodiments.

FIG. 1B is a block diagram of a cloud adaptor (CA) high availability (HA) design 100B, in accordance with some embodiments.

CDC-1 102B includes CAs 104B1, 104B2, and 104B3 operably coupled to a load balancer 106B. CAs 104B1, 104B2, and 104B3 perform similar to the CA devices discussed above. In a non-limiting example, CA1 104B1, CA2 104B2, and CA3 104B3 each include two pCore CPUs such as processing circuitry 502 of FIG. 5, six GB of random-access memory such as memory 504 of FIG. 5, and handle 500 parallel executions. In some embodiments, load balancer 106B is a F5 load balancer that ensures seamless failover in cases where a server, operably coupled to CAs 104B1, 104B2, is down or overloaded. The F5 load balancer redirects the traffic to other servers that handle the load. In some embodiments, an HA deployment consists of two systems, synchronized with the same configuration: (1) an active system that processes traffic, and (2) a standby system that remains in dormant mode until required. This pairing's goal is to provide users with seamless, uninterrupted service, in case one device fails. In response to the active system being taken offline or failing to connect, the standby system immediately takes over, to avoid processing traffic. Typically, the newly active system remains active until an event requires the first system to become active again or until manually forced into standby. HA makes sure that a server pool, operably coupled to CAs 104B1, 104B2, and 104B3 is ready for user requests in situations when a primary load balancer is down. Traffic is redirected to a backup/secondary load balancer with minimal downtime, which is unnoticeable to users.

Figure 1C:
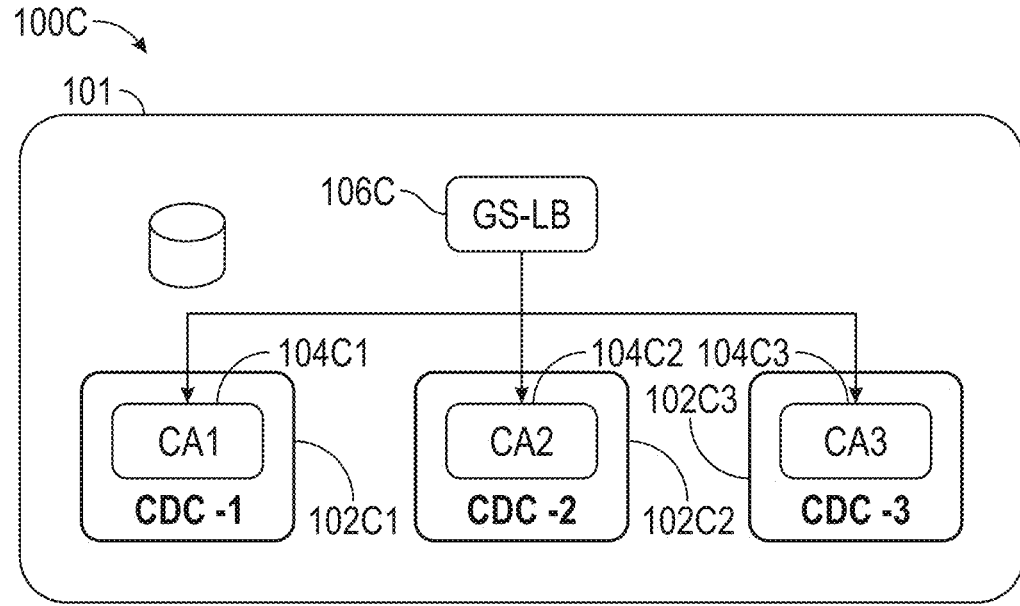
FIG. 1C is a block diagram of a cloud adaptor (CA) high availability (HA) design, in accordance with some embodiments.

FIG. 1C is a block diagram of a cloud adaptor (CA) high availability (HA) design 100C, in accordance with some embodiments.

CA system 101 includes CDC-1 102C1, CDC-2 102C2, and CDC-3 102C3. In some embodiments, each of cloud data centers CDC-1 102C1, CDC-2 102C2, and CDC-3 are in different locations in the same county, different locations in the same state, different locations in the same country, or different locations internationally. CDC-1 102C1 includes CA 104C1, CDC-2 102C1 includes CA2 104C2, and CDC-3 102C3 includes CA3 104C3 operably coupled to a load balancer 106C. CA1 104C1, 104C2, and 104C3 perform similar to the CA devices discussed above. In a non-limiting example, CA1 104C1, 104C2, and 104C3 includes two pCore CPUs, such as processing circuitry 502 of FIG. 5, eight GB of random-access memory, such as memory 504 of FIG. 5, and each handle 150 parallel executions. In another non-limiting example, CAs 104B1, 104B2, and 104B3 each include two pCore CPUs, such as processing circuitry 502 of FIG. 5, six GB of random-access memory, such as memory 504 of FIG. 5, and handle 500 parallel executions. In some embodiments, load balancer 106C is a global server (GS) load balancer which intelligently distributes traffic across server resources located in multiple geographies. The servers are on premises in a company's own on-premises data centers, hosted in a private cloud, hosted in the public cloud, a combination of each, or a combination of two of the three.

Figure 2:
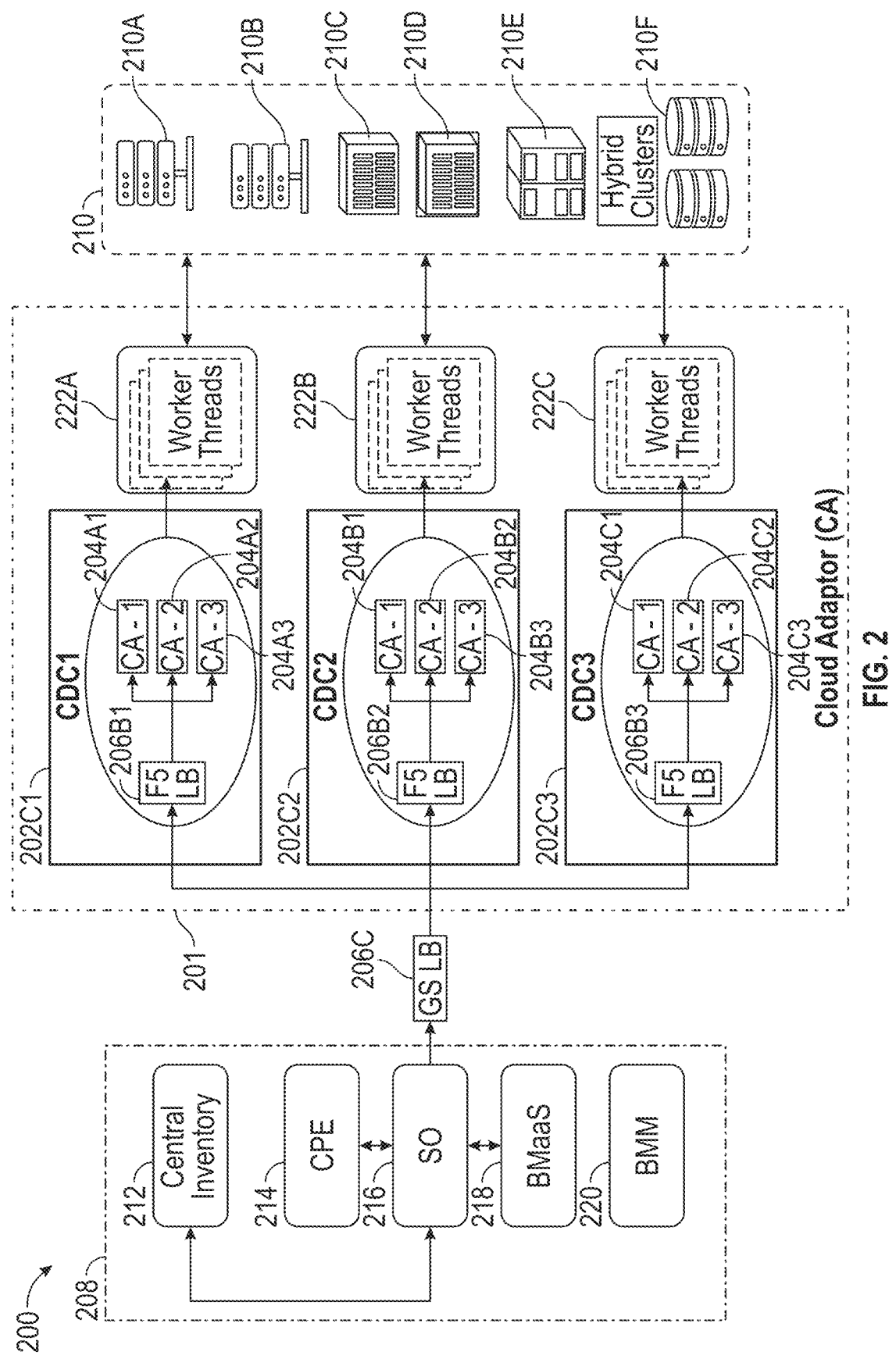
FIG. 2 is a diagrammatic representation a serverless parallel deployment system (SPDS), in accordance with some embodiments.

FIG. 2 is a diagrammatic representation a serverless parallel deployment system (SPDS) 200, in accordance with some embodiments.

SPDS 200 includes a network 208, a global load balancer 206C, a CA system 201 and a set of hybrid clusters 210. Hybrid clusters perform the dual role of an administration cluster and a user cluster. Hybrid clusters run workloads, and at the same time, and manage other clusters. Hybrid clusters eliminate running a separate administration cluster in resource-constrained scenarios and provide HA reliability. In an HA hybrid cluster, if one node fails, then others will take the failed node's place. Hybrid clusters are different from standalone clusters in that hybrid clusters further manage other clusters. Standalone clusters are unable to create or manage other clusters.

In some embodiments, network 208 is a cloud network. Cloud network computing is on-demand availability of computer system resources, especially data storage (e.g., cloud storage) and computing power, without direct active management by the user. Large clouds often have functions distributed over multiple locations, each location being a data center. In a non-limiting example, each of hybrid cluster 210A, 210B, 210C, 210D, 210E and 210F represents a data center located at a separate and distinct geographical location. Further, in some embodiments, each hybrid cluster is a combination of on-premises data centers and off premise data centers.

Network 208 includes a central inventory 212, a correlation and policy engine (CPE) 214, a service orchestrator (SO) 216, BMaaS 518, and bare metal manager (BMM) 220.

Central inventory 212 is configured to be used to track computers within a systems environment, and include information such as: files, directories, and storage devices; installed programs and features; local users, groups, and logon information; services, device drivers, and terminal services; and task history. Central inventory 212 includes discovery functions and computer asset tracking capabilities to monitor connected devices within a systems environment. This includes computers connected to the parent company's network or off-premises computers.

CPE 214 is a software application that programmatically understands relationships. CPEs are configured to be used in system management tools to aggregate, normalize, and analyze event data. Event correlation is a technique for making sense of many events and pinpointing the few events that are important in a mass of information. This is accomplished by looking for and analyzing relationships between events. Further, a CPE is a program or process that receives machine-readable policies and applies them to a particular problem domain to constrain the behavior of network resources.

In system administration, service orchestration is the automated configuration, coordination, and management of computer systems and software. Orchestration is often discussed in the context of service-oriented architecture, virtualization, provisioning, converged infrastructure, and dynamic data center topics. Service orchestration is about aligning the business request with the applications, data, and infrastructure. In the context of cloud computing, the main difference between workflow automation and orchestration is that workflows are processed and completed as processes within a single domain for automation purposes, whereas orchestration includes a workflow and provides a directed action towards larger goals and objectives. In this context, and with the overall aim to achieve specific goals and objectives (described through the quality of service (QoS) parameters), cloud management solutions further encompass frameworks for workflow mapping and management.

Bare-metal servers, switches are used as the underlying IT infrastructure in different types of cloud services (e.g., infrastructure as a service (IaaS), software as a service (SaaS), platform as a service (PaaS), function as a service (FaaS), and the like), and high-performance computing (HPC) clusters. A typical public cloud is configured to have thousands of bare-metal servers and hundreds of bare-metal switches in each datacenter. BMaaS 218 is a type of cloud service to manage bare-metal infrastructure. BMaaS is typically deployed as a private cloud behind the screens in public clouds and HPC clusters. BMaaS provides APIs to automate workflows in public cloud service, and HPC clusters. BMaaS is further provided as a public cloud service.

BMM 220 manages the life cycle of bare metal servers (BMS) by using a backend framework. The BMM manages the bare metal workload within a fabric. BMM includes BMM server life cycle management (LCM), onboarding of bare metal servers, bare metal image management, flavor management, inventory management, IP address management, security management, monitoring and reporting of life cycle management events, and discovery of bare metal servers.

SO 216 is operably connected to central inventory 212. In some embodiments, central inventory 212 includes deployments and/or upgrades for a telecommunications network, such as a global system for mobile communications (GSM) RAN, a GSM/EDGE RAN, a universal mobile telecommunications system (UMTS) RAN (UTRAN), an evolved UMTS terrestrial radio access network (E-UTRAN), open RAN (O-RAN), or cloud-RAN (C-RAN).

SO 216 is further operably connected to CPE 214. SO 216 is configured to communicate events from the telecommunications network including SPDS 200. CPE 214 communicates actions, notifications, and/or warnings for SO 216 based upon incoming events from SO 216 and rule-based policies upon which CPE 214 operates.

SO 216 is further operably connected to BMaaS 518. SO 216 communicates with BMaaS to retrieve information from the BMaaS and delivers instructions regarding the purchase of services through BMaaS.

Figure 3:
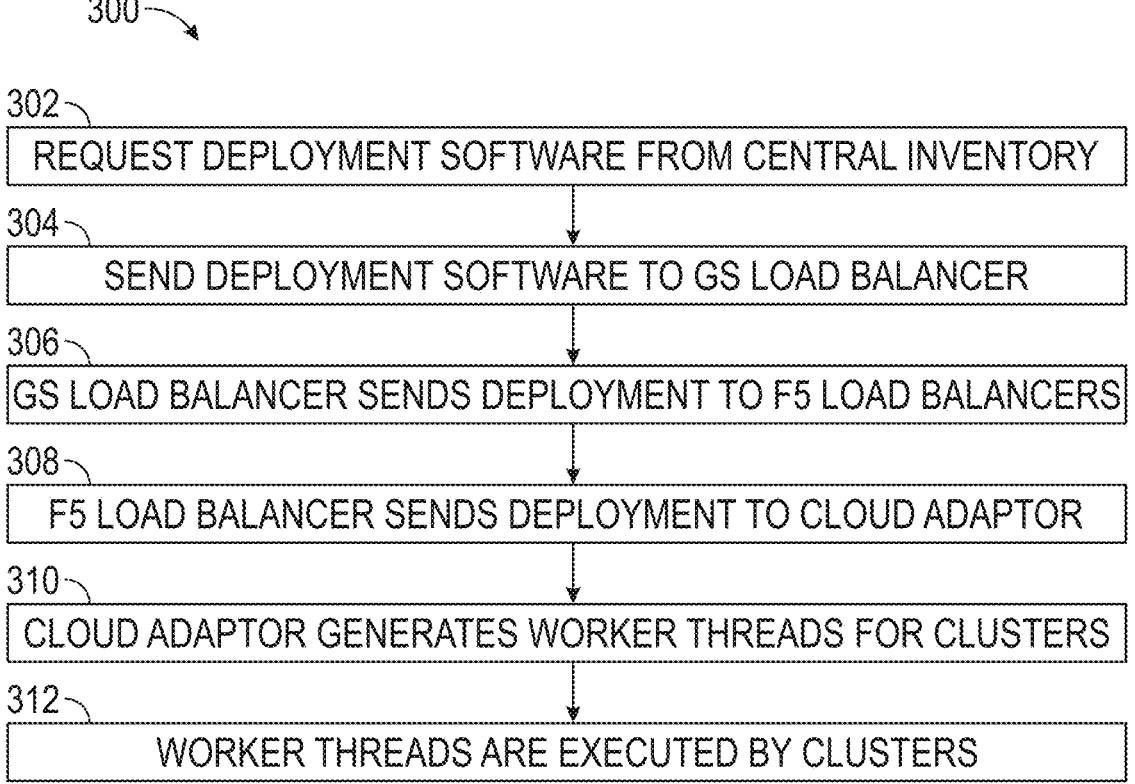
FIG. 3 is a flow diagram of a method for serverless parallel deployment (SPD), in accordance with some embodiments.

FIG. 3 is a flow diagram of a method for serverless parallel deployment (SPD) 300, in accordance with some embodiments.

FIGS. 2 and 3 are discussed together to provide an understanding of the operation of SPDS 200 through method for SPD 300. In some embodiments, method for SPD 300 is a functional overview of a SPDS, such as SPDS 200. In some embodiments, method for SPD 300 is executed by processing circuitry 502 discussed below with respect to FIG. 5. In some embodiments, some, or all the operations of method for SPD 300 are executed in accordance with instructions corresponding to instructions 506 discussed below with respect to FIG. 5.

Method for SPD 300 includes operations 302-312, but the operations are not necessarily performed in the order shown. Operations are added, replaced, order changed, and/or eliminated as appropriate, in accordance with the spirit and scope of the embodiments. In some embodiments, one or more of the operations of method for SPD 300 are repeated. In some embodiments, unless specifically stated otherwise, the operations of method for SPD 300 are performed in order.

At operation 302 of method for SPD 300, SO 216 retrieves software for deployment/upgrade from central inventory 212. Process flows from operation 302 to operation 304.

At operation 304 of method for SPD 300, SO 216 sends the software for deployment/upgrade to GS load balancer 206C. In some embodiments, GS load balancer 206C is configured to use a dumb load balancing strategy, based on randomizing the distribution of traffic. For example, round-robin DNS, a randomized DNS load balancing technique, sends each request to a different server than the last. In some embodiments, GS load balancer is configured to use smart load balancing techniques that analyze data to decide which is the best server to handle a request. In some embodiments, GS load balancer is configured to use anycast routing that picks a server based in part on the quickest travel time between the client and the server. Process flows from operation 304 to operation 306.

At operation 306 of method for SPD 300, GS load balancer 206C begins sending at least a portion of the software deployment/upgrade to F5 load balancers 206B1, 206B2, and 206B3 each included respectively at CDCs spread geographically, such as CDC1 202C1, CDC2 202C2, and CDC3 202C3. Process flows from operation 306 to operation 308.

At operation 308 of method for SPD 300, each F5 load balancer 206B1, 206B2, and 206B3 distributes at least a portion of the software deployment/upgrade to one or more CAs 204A1, 204A2, 204A3, 204B1, 204B2, 204B3, 204C1, 204C2, and 204C3. In some embodiments, an F5 load balancer is configured to act as a reverse proxy (e.g., application that sits in front of back-end applications and forwards client (e.g. browser) requests to those applications) and distribute network or application traffic across several CAs. In some embodiments, F5 load balancers are configured to be used to increase capacity (concurrent users) and reliability of applications. F5 load balancers improve the overall performance of applications by decreasing the burden on CAs associated with managing and maintaining application and network sessions, as well as by performing application-specific tasks. In some embodiments, F5 load balancers 206B1, 206B2, and 206B3 are configured to act upon data found in network and transport layer protocols (internet protocol (IP), transmission control protocol (TCP), file transfer protocol (FTP), user datagram protocol (UDP)). In some embodiments, F5 load balancers are configured to distribute requests based upon data found in application layer protocols such as hypertext transfer protocol (HTTP). In some embodiments, requests are received by load balancers 206B1, 206B2, and 206B3 and distributed to CAs 204A1, 204A2, 204A3, 204B1, 204B2, 204B3, 204C1, 204C2, and 204C3 based on a configured algorithm. In a non-limiting example, algorithms include: round robin (time slices are assigned to each process in equal portions and in circular order, handling all processes without priority), weighted round robin (offers to each a fixed number of opportunities, as specified by the configured weight which serves to influence the portion of capacity received by each queue or task), least connections (maintains a record of active CA connections and forwards a new connection to the CA with the least number of active connections), and least response time (directs traffic to a CA with the fewest active connections and the lowest average response time). In some embodiments, F5 load balancers 206B1, 206B2, and 206B3 further distribute requests based on application specific data such as HTTP headers, cookies, or data within the application message, such as the value of a specific parameter. Process flows from operation 308 to operation 310.

At operation 310 of method for SPD 300, each CA 204A1, 204A2, 204A3, 204B1, 204B2, 204B3, 204C1, 204C2, and 204C3 generates worker threads 222A, 222B, and 222C and sends the worker threads to hybrid clusters 210A-210F. In some embodiments, worker threads are configured to execute different tasks in multiple parallel contexts of execution in a concurrent manner, which takes advantage of multiprocessor and multithreaded environments. In some embodiments, a worker thread is a continuous parallel thread that runs and accepts messages until time is explicitly closed or terminated. Messages to a worker thread are sent from the parent thread or child worker threads. In some embodiments, a worker includes logic that gets executed in parallel for each of the messages received. In response to a worker thread being busy handling messages, incoming messages are queued for processing. Sharing data between parent thread and worker threads is done through message passing and by default variables, functions, or state is not shared. Process flows from operation 310 to operation 312.

At operation 312 of method for SPD 300, worker threads 222A, 222B, and 222C are sent to set of hybrid clusters 210 where worker threads 222A, 222B, and 222C are processed.

computing power on premises is improved by 90%. In some embodiments, a 90% improvement in deployment time is realized as the deployment processing is performed in parallel on multiple sites. Further, all cloud network platforms are supported as the CAs support any cloud platform. Additionally, all cloud providers are supported by the CAs.

Figure 4:
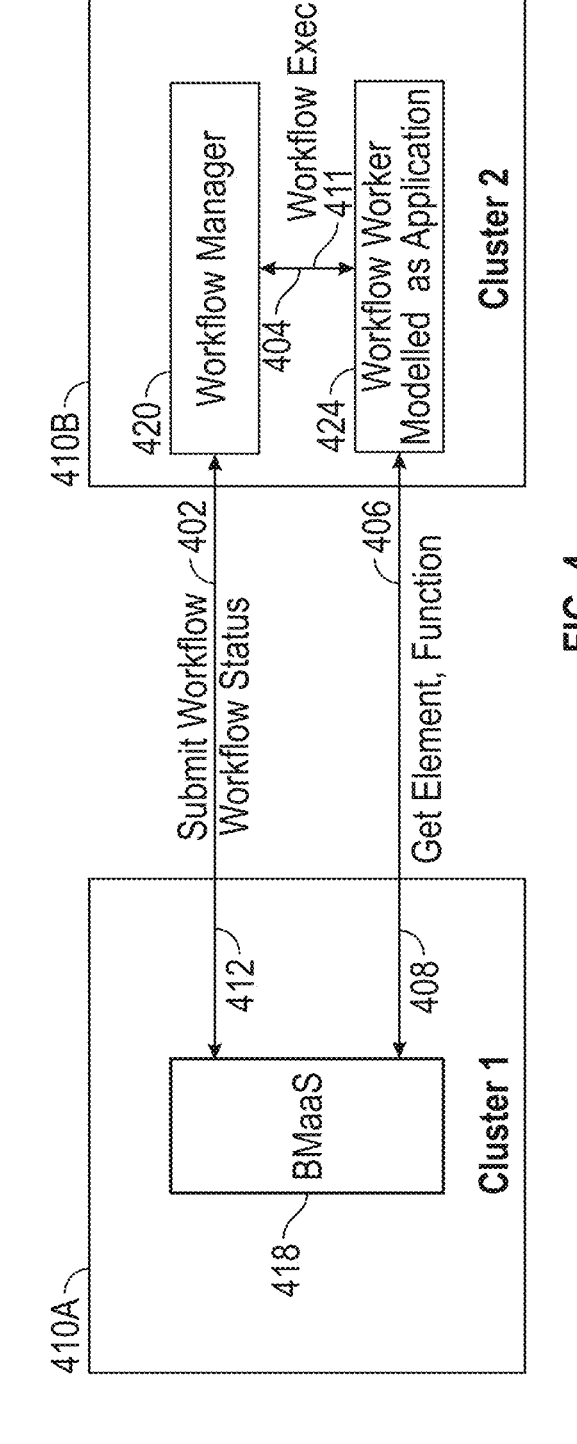
FIG. 4 is a data flow diagram of a method for bare metal as a service (BMaaS) workflow, in accordance with some embodiments.

FIG. 4 is a data flow diagram of a method for BMaaS workflow 400, in accordance with some embodiments.

FIG. 4 is discussed to provide an understanding of the operation of BMaaS 518 and BMM 220 through method for BMaaS workflow 400. In some embodiments, method for BMaaS workflow 400 is a functional overview of BMaaS 218 and BMM 220. In some embodiments, method for BMaaS workflow 400 is executed by processing circuitry 502 discussed below with respect to FIG. 5. In some embodiments, some, or all the operations of method for BMaaS workflow 400 are executed in accordance with instructions corresponding to instructions 506 discussed below with respect to FIG. 5.

Method for BMaaS workflow 400 includes operations 402-412, but the operations are not necessarily performed in the order shown. Operations are added, replaced, order changed, and/or eliminated as appropriate, in accordance with the spirit and scope of the embodiments. In some embodiments, one or more of the operations of method for BMaaS workflow 400 are repeated. In some embodiments, unless specifically stated otherwise, the operations of method for BMaaS workflow 400 are performed in order.

At operation 402 of method for BMaaS workflow 400, BMaaS application 418, included on server cluster 410A, sends workflow to BMM 420, included on server cluster 410B. In some embodiments, the submitted workflow sent by BMaaS application 418 are workflow threads, such as

TABLE 1

| Cloud Adaptor Efficiency | | |
| --- | --- | --- |
| FEATURES | CLOUD ADAPTOR | COMMENTS |
| Parallel processes | >200 | execute 600 parallel processes with 3 CA pods, |
| Memory usage | 20% usage Min: 10 KB Max: 5 MB | 80% memory usage is realized as everything is serverless framework |
| CPU usage | 20% usage Max: 0.01 CPU quota | 80-90% of CPU usage is realized as SPD 300 is based on thread vs microservices |
| Compute Power | 90% improved Max time on 1000 nodes: 50 mins | 90% time is saved as deployment processes are performed in parallel on multiple sites |
| Cloud Platforms | ANY Platform | CA supports any Cloud platform like K8s, VMWare, Openshift, and the like |
| Cloud Providers | ANY Provider | CA will support any Cloud Provider like (AWS, GCP, Dell, VMWare, and the like) |

Figure 5:
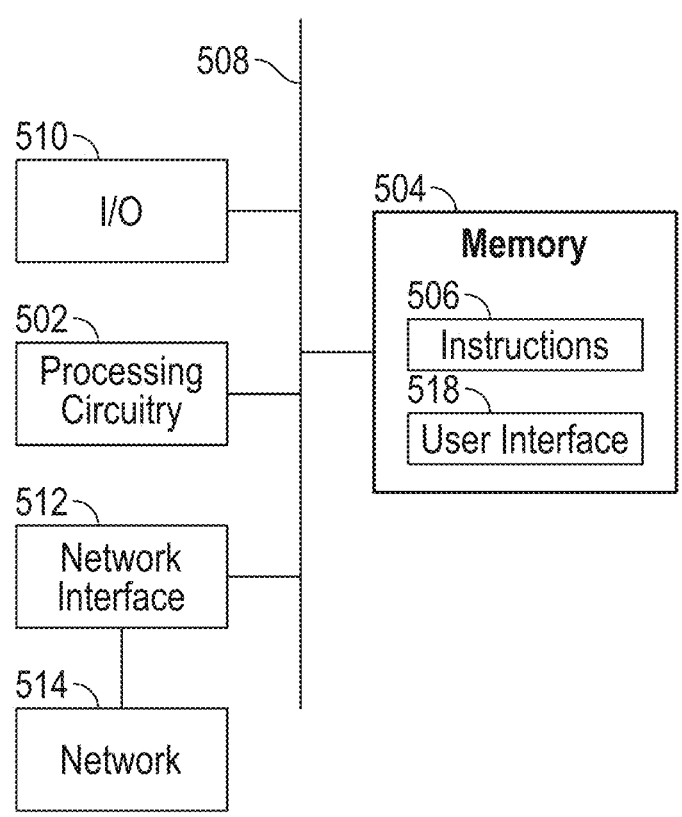
FIG. 5 is a high-level functional block diagram of a processor-based system, in accordance with some embodiments.

With reference to Table 1 above, in some embodiments, each CA performs over 200 parallel processes and 600 parallel processes with three CA pods. In some embodiments, on-premises memory usage is conserved with 20% usage in the deployment process. In some embodiments, a memory savings of 80% is realized as a large portion of the processing is performed on a serverless framework. In some embodiments, on-premises central processing units, such as processor 502 of FIG. 5, is conserved with a 20% usage in the deployment process. In some embodiments, an 80%-90% CPU usage is realized as method for SPD 300 is based on thread workers vs. microservices. In some embodiments, workflow threads 222A, 222B, and 222C. In some embodiments, server clusters 410A and 410B are container-based clusters. In some embodiments, server clusters 410A and 410B are Robin clusters. Robin is a Kubernetes-based platform that automates the deployment, scaling, and LCM of data and network intensive applications. Kubernetes is an open-source container orchestration system for automating software deployment, scaling, and management. In some embodiments, server clusters 410A and 410B are similar to hybrid clusters 210A-210F. In some embodiments, BMaaS 418 is similar to BMaaS 218. In some embodiments, BMM 420 is similar to BMM 220. Process flows from operation 402 to operation 404.

At operation 404 of method for BMaaS workflow 400, BMM 420 assigns workflow execution to a worker 424. In some embodiments, worker 424 is modeled as an application. A worker is something given a task during a process, while the worker (or multiple workers) process the task on a different thread. In response to the workers completing the task, the worker issues a notification via a call back method (e.g., a special method provided on the initial call gets called). Process flows from operation 404 to operation 406.

At operation 406 of method for BMaaS workflow 400, worker 424 places a GET call, for an element and function to process, to BMaaS application 418. The GET method requests that the target resource transfer a state representation. GET requests retrieve data and have no other effect. Get enables bookmarking and sharing and makes GET responses eligible for caching, which saves bandwidth. Process flows from operation 406 to operation 408.

At operation 408 of method for BMaaS workflow 400, BMaaS application 418 sends an element and function to worker 424 for execution. Process flows from operation 408 to operation 411.

At operation 411 of method for BMaaS workflow 400, worker 424 provides BMM 420 with a workflow status. Process flows from operation 411 to operation 412.

At operation 412 of method for BMaaS workflow 400, BMM 420 provides BMaaS application 418 with the workflow status. In some embodiments, the workflow status relates directly to the element and function retrieved by worker 424 in operations 406 and 408.

FIG. 5 is a block diagram of processor-based system 500 in accordance with some embodiments. In some embodiments, Processor-based system 500 is a general-purpose computing device including a hardware processing circuitry 502 and a non-transitory, computer-readable storage medium 504. Storage medium 504, amongst other things, is encoded with, i.e., stores, computer instructions 506, i.e., a set of executable instructions such as a method for serverless parallel deployment 300 and method for BMaaS workflow 400. Execution of instructions 506 by hardware processing circuitry 502 represents (at least in part) a CPE tool which implements a portion or all the methods, such as methods 300 and 400, described herein in accordance with one or more embodiments (hereinafter, the noted processes and/or methods).

Hardware processing circuitry 502 is electrically coupled to a computer-readable storage medium 504 via a bus 508. Hardware processing circuitry 502 is further electrically coupled to an I/O interface 510 by bus 508. A network interface 512 is further electrically connected to processing circuitry 502 via bus 508. Network interface 512 is connected to a network 514, so that processing circuitry 502 and computer-readable storage medium 504 connect to external elements via network 514. Processing circuitry 502 is configured to execute computer instructions 506 encoded in computer-readable storage medium 504 in order to cause Processor-based system 500 to be usable for performing the noted processes and/or methods, such as methods 300 and 400 of FIGS. 3 and 4. In one or more embodiments, processing circuitry 502 is a central processing unit (CPU), a multi-processor, a distributed processing system, an application specific integrated circuit (ASIC), and/or a suitable processing unit.

In one or more embodiments, computer-readable storage medium 504 is an electronic, magnetic, optical, electromagnetic, infrared, and/or a semiconductor system (or apparatus or device). For example, computer-readable storage medium 504 includes a semiconductor or solid-state memory, a magnetic tape, a removable computer diskette, a random-access memory (RAM), a read-memory (ROM), a rigid magnetic disk, and/or an optical disk. In one or more embodiments using optical disks, computer-readable storage medium 504 includes a compact disk-read memory (CD-ROM), a compact disk-read/write (CD-R/W), and/or a digital video disc (DVD).

In one or more embodiments, storage medium 504 stores computer instructions 506 configured to cause Processor-based system 500 to be usable for performing a portion or the noted processes and/or methods. In one or more embodiments, storage medium 504 further stores information, such as a method for serverless parallel deployment 300 which facilitates performing the noted processes and/or methods.

Processor-based system 500 includes I/O interface 510 that is like UI 208. I/O interface 510 is coupled to external circuitry. In one or more embodiments, I/O interface 510 includes a keyboard, keypad, mouse, trackball, trackpad, touchscreen, cursor direction keys and/or other suitable I/O interfaces are within the contemplated scope of the disclosure for communicating information and commands to processing circuitry 502.

Processor-based system 500 further includes network interface 512 coupled to processing circuitry 502. Network interface 512 allows Processor-based system 500 to communicate with network 514, to which one or more other computer systems are connected. Network interface 512 includes wireless network interfaces such as BLUETOOTH, WIFI, WIMAX, GPRS, or WCDMA; or wired network interfaces such as ETHERNET, USB, or IEEE-864. In one or more embodiments, noted processes and/or methods, are implemented in two or more Processor-based system 500.

Processor-based system 500 is configured to receive information through I/O interface 510. The information received through I/O interface 510 includes one or more of instructions, data, and/or other parameters for processing by processing circuitry 502. The information is transferred to processing circuitry 502 via bus 508. Processor-based system 500 is configured to receive information related to a UI through I/O interface 510. The information is stored in computer-readable medium 504 as user interface (UI) 518.

In some embodiments, the noted processes and/or methods are implemented as a standalone software application for execution by processing circuitry. In some embodiments, the noted processes and/or methods are implemented as a software application that is a part of an additional software application. In some embodiments, the noted processes and/or methods is implemented as a plug-in to a software application.

In some embodiments, the processes are realized as functions of a program stored in a non-transitory computer readable recording medium. Examples of a non-transitory computer-readable recording medium include, but are not limited to, external/removable and/or internal/built-in storage or memory unit, e.g., one or more of an optical disk, such as a DVD, a magnetic disk, such as a hard disk, a semiconductor memory, such as a ROM, a RAM, a memory card, and the like.

In some embodiments, a system, includes processing circuitry; and a memory connected to the processing circuitry, wherein the memory is configured to store executable instructions that, in response to being executed by the processing circuitry, facilitate performance of operations to request deployment software for a telecommunications system from a central inventory; send the deployment software to a load balancer that distributes executable portions of the deployment software to two or more cloud adaptors (CAs)

that are operably connected to the load balancer; generate worker threads based on the distributed executable portions of the deployment software; and distribute the worker threads to hybrid clusters for execution of the worker threads and implementation of the deployment software.

In some embodiments, the instructions that, in response to being executed by the processing circuitry, further facilitate performance of operations to: distribute, from the load balancer which is a first load balancer, the executable portions of the deployment software to two or more second load balancers.

In some embodiments, the first load balancer is a global server (GS) load balancer configured to distribute the executable portions of the deployment software to the two or more second load balancers located in multiple geographies.

In some embodiments, the instructions that, in response to being executed by the processing circuitry, further facilitate performance of operations to distribute, by the second load balancers which are F5 load balancers, the executable portions of the deployment software across two or more CAs.

In some embodiments, the instructions that, in response to being executed by the processing circuitry, further facilitate performance of operations to submit workflow from a first hybrid cluster, based upon the worker threads, to a workflow manager located in a second hybrid cluster.

In some embodiments, the instructions that, in response to being executed by the processing circuitry, further facilitate performance of operations to assign the workflow through the workflow manager to workers in the second hybrid cluster.

In some embodiments, the instructions that, in response to being executed by the processing circuitry, further facilitate performance of operations to notify the workflow manager upon completion of assigned workflow by a worker.

In some embodiments, the instructions that, in response to being executed by the processing circuitry, further facilitate performance of operations to notify bare metal as a service application on the first hybrid cluster of workflow status by the workflow manager.

In some embodiments, a method executed by processing circuitry, includes requesting, by a service orchestrator, deployment software for a telecommunications system from a central inventory; sending, by the service orchestrator, the deployment software to a load balancer that distributes executable portions of the deployment software to two or more cloud adaptors (CAs) that are operably connected to the load balancer; generating, by the two or more CAs, worker threads based on the distributed executable portions of the deployment software; and distributing, by the two or more CAs, the worker threads to hybrid clusters for execution of the worker threads and implementation of the deployment software.

In some embodiments, the method further includes distributing, from the load balancer which is a first load balancer, the executable portions of the deployment software to two or more second load balancers.

In some embodiments, the method further includes distributing, by the first load balancer which is a global server (GS) load balancer, the executable portions of the deployment software to the two or more second load balancers located in multiple geographies.

In some embodiments, the method further includes distributing, by the second load balancers which are F5 load balancers, the executable portions of the deployment software across two or more CAs.

In some embodiments, the method further includes submitting, by a bare metal as a service (BMaaS) application, workflow from a first hybrid cluster, based upon the worker threads, to a workflow manager located in a second hybrid cluster.

In some embodiments, the method further includes assigning, by the workflow manager, workflow through the workflow manager to workers in the second hybrid cluster.

In some embodiments, the method further includes notifying, by a worker, the workflow manager upon completion of assigned workflow.

In some embodiments, the method further includes notifying, by the workflow manager, the BMaaS application on the first hybrid cluster of workflow status.

In some embodiments, a non-transitory tangible computer readable storage medium storing a computer program, wherein the computer program contains instructions that in response to being executed, cause processing circuitry to perform operations to request deployment software for a telecommunications system from a central inventory; send the deployment software to a load balancer that distributes executable portions of the deployment software to two or more cloud adaptors (CAs) that are operably connected to the load balancer; generate worker threads based on the distributed executable portions of the deployment software; and distribute the worker threads to hybrid clusters for execution of the worker threads and implementation of the deployment software.

In some embodiments, the instructions that, in response to being executed by the processing circuitry, further facilitate performance of operations to distribute, from the load balancer which is a first load balancer, the executable portions of the deployment software to two or more second load balancers.

In some embodiments, the first load balancer is a global server (GS) load balancer configured to distribute the executable portions of the deployment software to the two or more second load balancers located in multiple geographies.

In some embodiments, the instructions that, in response to being executed by the processing circuitry, further facilitate performance of operations to distribute, by the second load balancers which are F5 load balancers, the executable portions of the deployment software across two or more CAs.

The foregoing outlines features of several embodiments so that those skilled in the art better understand the embodiments. Those skilled in the art appreciate that ready use of the present disclosure as a basis for designing or modifying other processes and structures for carrying out the same purposes and/or achieving the same advantages of the embodiments introduced herein. Those skilled in the art further realize that such equivalent constructions do not depart from the spirit and scope of the embodiments, and that various changes, substitutions, and alterations do not depart from the spirit and scope of the embodiments.

What is claimed is:

1. A system, comprising:
processing circuitry; and
a memory connected to the processing circuitry, wherein the memory is configured to store executable instructions that, in response to being executed by the processing circuitry, facilitate performance of operations to:
request deployment software for a telecommunications system from a central inventory;
send the deployment software to a load balancer that distributes executable portions of the deployment software to two or more cloud adaptors (CAs) that are operably connected to the load balancer;

generate worker threads based on the distributed executable portions of the deployment software; and distribute the worker threads to hybrid clusters for execution of the worker threads and implementation of the deployment software, wherein at least one hybrid cluster of the hybrid clusters is configured for running workloads and managing other clusters in parallel.

2. The system of claim 1, wherein the instructions that, in response to being executed by the processing circuitry, further facilitate performance of operations to:

distribute, from the load balancer which is a first load balancer, the executable portions of the deployment software to two or more second load balancers.

3. The system of claim 2, wherein the first load balancer is a global server (GS) load balancer configured to distribute the executable portions of the deployment software to the two or more second load balancers located in multiple geographies.

4. The system of claim 3, wherein the instructions that, in response to being executed by the processing circuitry, further facilitate performance of operations to:

distribute, by the second load balancers which are F5 load balancers, the executable portions of the deployment software across two or more CAs.

5. The system of claim 1, wherein the instructions that, in response to being executed by the processing circuitry, further facilitate performance of operations to:

submit workflow from a first hybrid cluster, based upon the worker threads, to a workflow manager located in a second hybrid cluster.

6. The system of claim 5, wherein the instructions that, in response to being executed by the processing circuitry, further facilitate performance of operations to:

assign the workflow through the workflow manager to workers in the second hybrid cluster.

7. The system of claim 5, wherein the instructions that, in response to being executed by the processing circuitry, further facilitate performance of operations to:

notify the workflow manager upon completion of assigned workflow by a worker.

8. The system of claim 7, wherein the instructions that, in response to being executed by the processing circuitry, further facilitate performance of operations to:

notify bare metal as a service application on the first hybrid cluster of workflow status by the workflow manager.

9. A method executed by processing circuitry, comprising:

requesting, by a service orchestrator, deployment software for a telecommunications system from a central inventory;

sending, by the service orchestrator, the deployment software to a load balancer that distributes executable portions of the deployment software to two or more cloud adaptors (CAs) that are operably connected to the load balancer;

generating, by the two or more CAs, worker threads based on the distributed executable portions of the deployment software; and distributing, by the two or more CAs, the worker threads to hybrid clusters for execution of the worker threads and implementation of the deployment software, wherein at least one hybrid cluster of the hybrid clusters is configured for running workloads and managing other clusters in parallel.

10. The method of claim 9, further comprising:

distributing, from the load balancer which is a first load balancer, the executable portions of the deployment software to two or more second load balancers.

11. The method of claim 10, further comprising:

distributing, by the first load balancer which is a global server (GS) load balancer, the executable portions of the deployment software to the two or more second load balancers located in multiple geographies.

12. The method of claim 11, further comprising:

distributing, by the second load balancers which are F5 load balancers, the executable portions of the deployment software across two or more CAs.

13. The method of claim 9, further comprising:

submitting, by a bare metal as a service (BMaaS) application, workflow from a first hybrid cluster, based upon the worker threads, to a workflow manager located in a second hybrid cluster.

14. The method of claim 13, further comprising:

assigning, by the workflow manager, workflow through the workflow manager to workers in the second hybrid cluster.

15. The method of claim 14, further comprising:

notifying, by a worker, the workflow manager upon completion of assigned workflow.

16. The method of claim 15, further comprising:

notifying, by the workflow manager, the BMaaS application on the first hybrid cluster of workflow status.

17. A non-transitory tangible computer readable storage medium storing a computer program, wherein the computer program contains instructions that in response to being executed, cause processing circuitry to perform operations to:

request deployment software for a telecommunications system from a central inventory;

send the deployment software to a load balancer that distributes executable portions of the deployment software to two or more cloud adaptors (CAs) that are operably connected to the load balancer;

generate worker threads based on the distributed executable portions of the deployment software; and distribute the worker threads to hybrid clusters for execution of the worker threads and implementation of the deployment software, wherein at least one hybrid cluster of the hybrid clusters is configured for running workloads and managing other clusters in parallel.

18. The non-transitory tangible computer readable storage medium of claim 17, wherein the instructions that, in response to being executed by the processing circuitry, further facilitate performance of operations to:

distribute, from the load balancer which is a first load balancer, the executable portions of the deployment software to two or more second load balancers.

19. The non-transitory tangible computer readable storage medium of claim 18, wherein the first load balancer is a global server (GS) load balancer configured to distribute the executable portions of the deployment software to the two or more second load balancers located in multiple geographies.

20. The non-transitory tangible computer readable storage medium of claim 19, wherein the instructions that, in response to being executed by the processing circuitry, further facilitate performance of operations to:

distribute, by the second load balancers which are F5 load balancers, the executable portions of the deployment software across two or more CAs.

* * * * *